United States Patent [19]
Ohneda et al.

[11] Patent Number: 5,831,751
[45] Date of Patent: Nov. 3, 1998

[54] IMAGE PROCESSING APPARATUS

[75] Inventors: Shougo Ohneda, Urayasu; Hiroaki Suzuki, Ichikawa; Hiroki Kubozono, Yokohama; Manabu Komatsu, Tokyo; Etsuo Morimoto, Yokohama, all of Japan

[73] Assignee: Ricoh Company, Ltd., Tokyo, Japan

[21] Appl. No.: 603,086

[22] Filed: Feb. 16, 1996

[30] Foreign Application Priority Data

Feb. 20, 1995 [JP] Japan ................................. 7-031200
Feb. 9, 1996 [JP] Japan ................................. 8-024492

[51] Int. Cl.$^6$ ................................. G03F 3/08; G06K 9/36
[52] U.S. Cl. ................................. 358/521; 382/251; 382/252; 358/463; 358/465
[58] Field of Search ................................. 382/167, 170, 382/251, 252, 253; 358/443, 445, 447, 448, 463, 465, 466, 521, 523, 525, 530

[56] References Cited

U.S. PATENT DOCUMENTS

5,138,673   8/1992   Koshida et al. ......................... 382/56
5,282,256   1/1994   Ohsawa et al. ......................... 382/56

Primary Examiner—Thomas D. Lee
Assistant Examiner—Jerome Grant, II
Attorney, Agent, or Firm—Oblon, Spivak, McClelland, Maier & Neustadt, P.C.

[57] ABSTRACT

There is provided by the present invention an image processing apparatus for outputting a multiple gradation color image with a printer which can express colors fewer than those specified in input image data comprising an output color predicting section for predicting colors, which will be reproduced by a printer, from color control signals given to the printer, an error computing/error adding section for computing an error between colors specified in input image data and those predicted by the output color predicting section, diffusing the error to peripheral pixels and adding the diffused error to a value of each of the pixels, and an output color selecting section for selecting colors to be reproduced by the printer, which are closest to colors specified in the input image data, according to an output from the error computing/error adding section.

16 Claims, 9 Drawing Sheets

INPUT SYSTEM

OUTPUT SYSTEM

INPUT SYSTEM

OUTPUT SYSTEM

IMAGE PROCESSING APPARATUS

FIELD OF THE INVENTION

The present invention relates to an image processing apparatus for reproducing input color data with the same colors by a color printer, and more particularly to an image processing apparatus for outputting a multi-gradation color image using a color printer having a function which can reproduce input image data with a smaller number of colors than colors specified by the input image data.

BACKGROUND OF THE INVENTION

In the conventional color printer which reproduces input image data with a smaller number of colors than those specified by the data in one dot, an image processing for reproducing an image with the same number of colors as those specified by the input data is executed. For instance, each output color such as Y (Yellow), M (Magenta), C (Cyan), or R (Red), G (Green), and B (Blue) is adjusted to a number of gradations which can be reproduced in one dot by using the intermediate gradation reproducing method known as the dither method or error diffusion processing to express the image with multiple gradations, thus a number of reproduced colors being increased.

Figure 11:
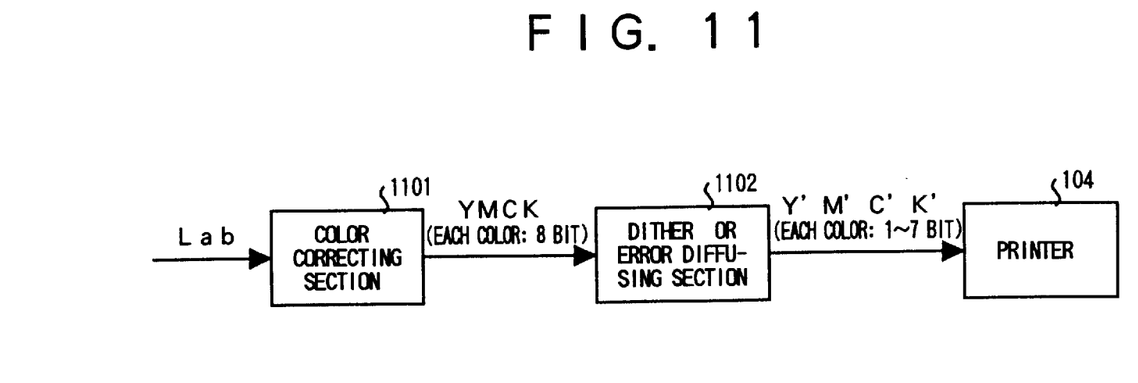
FIG. 11 is a block diagram showing a general configuration of an image processing apparatus based on the conventional technology.

For instance, as a typical one, there is an image processing apparatus, as shown in FIG. 11, comprising a color correcting section 1101, a dither or error diffusing section 1102, and a printer 104. With this configuration, color data Lab inputted to the color correcting section 1101 is subjected to the dither processing or the error diffusion processing and is then subjected to a color correction processing to convert the input color data to signals for controlling an output from the apparatus, namely 8-bit data for Y, M, C, and K, respectively.

Then in the dither or error diffusing section 1102, the signals are corrected to 1 to 7-bit data for output for each of Y', M', C', and K', and the data is sent to the printer 104, thus a multi-gradation image being outputted.

However in the image processing apparatus as described above, as a simulated intermediate gradation image is reproduced with dot configuration by subjecting Y, M, C and K signals to the intermediate gradation reproducing processing such as the dither processing or the error diffusion processing, sometimes an unpreferable image called a texture image may be generated, and also as either one of the two types of processing described above is executed independently, it has been difficult to reproduce accurately the same colors as those specified by the data.

SUMMARY OF THE INVENTION

It is an object of the present invention to eliminate the possibility of the generation of a texture image and also to obtain an image with colors accurately reproduced from those specified in the data in a case where an image output device, which reproduces an image with a smaller number of colors than those specified in the data in one dot, is used.

In an image processing apparatus according to the present invention, an output color predicting means predicts colors reproduced by a printer from YMCK signals outputted from an output color selecting means to an output device (printer), and a result of the prediction is fed back to an error computing means. Then the error computing means computes an error between a fed-back color predicted by the printer and a color in input image data, diffuses the error to peripheral pixels and adds the diffused errors to a value of each of the pixels, gives the summed value to the output selecting means, and a color reproduced by the printer closest to a color specified by input image data is selected thereby, so that it is possible to obtain a satisfactory reproduced image in which the generation of texture images is avoided.

In an image processing apparatus according to the present invention, an input color predicting means receives device-dependent image data, predicts device-independent colors of the input image, and inputs the predicted color into the error computing means. Then the output color predicting means predicts a color reproduced by the printer from YMCK signals outputted from the output color selecting means to the output device (printer), and feeds back the result thereof to the error computing means. Therein, the error computing means computes an error between a fed-back color predicted by the printer and a color in input image data, diffuses the error to peripheral pixels and adds the diffused error to a value of each of the pixels, gives the resultant value to the output color selecting means, and a color reproduced by the printer closest to a color specified by the input image data is selected thereby, so that it is possible to avoid the generation of texture images, and to obtain color reproduction more accurate to the device-independent data.

An image processing apparatus according to the present invention allocates input image data to one of representative colors representing a color reproduction range in an input system, and corresponding one of representative colors representing a color reproduction range in an output system to one of representative colors in the input system, so that color reproduction can be realized under stable conditions which color variation in an output device hardly affects.

With the image processing apparatus according to the present invention, color reproduction more accurate to device-dependent data can be executed by setting input image data processed by the error computing means to device-independent color data.

An image processing apparatus according to the present invention can achieve reduction of a period of time required for the processing as well as reduction of weight in a volume of hardware by setting a bit number for color correction output to a value smaller than a bit number for an input and outputting it by using a color correction system for an ordinary output color selecting means, for instance, by using a color correction system with 8-point interpolation or masking.

In an image processing apparatus according to the present invention, a color image can be reproduced by using colors less than colors to be used for expression, so that a highlight section is not used, which makes it possible to stabilize output colors.

Other objects and features of this invention will become understood from the following description with reference to the accompanying drawings.

DESCRIPTION OF THE PREFERRED EMBODIMENTS

Figure 1:
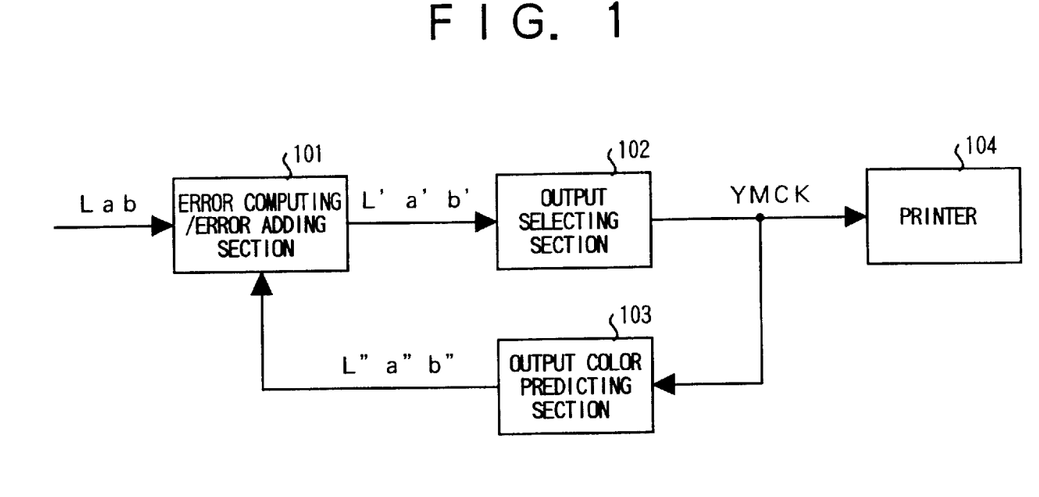
FIG. 1 is a block diagram showing a general configuration of an image processing apparatus according to Embodiment 1 of the present invention.

Next, a detailed description is made for embodiments of an image processing apparatus according to the present invention. FIG. 1 is a block diagram showing a general configuration of an image processing apparatus according to the present invention to realize the first invention applied herein.

In FIG. 1, designated at the reference numeral 101 is an error computing/error adding section as an error computing means for computing an error between predicted values for input colors and output colors by receiving an image data Lab and adding errors in pixels processed previously, at 102 an output color selecting section as an output color selecting means for converting each data (Y, M, C and K) outputted from the output color L'a'B' of the error computing/error adding section 101, computing a distance between an input color and a color reproduced by a printer and selecting the closest color, at 103 an output color predicting section as an output color predicting means for predicting output colors and giving predicted colors L"a"b" to the error computing/error adding section 101, and at 104 a printer for outputting the data according to YMCK data outputted from the output color selecting section 102.

Next, a description is made for operations of the image processing apparatus having the configuration as described above. The image data Lab inputted into this apparatus is first processed in the error computing/error adding section 101. In this error computing/error adding section 101, errors in pixels processed previously are summed up, and the resultant value is outputted to the output color selecting section 102. In the output color selecting section 102, the data is converted to those for each color (Y, M, C, and K) outputted from the printer 104, and the data is outputted to the printer 104.

The output color selecting section 102 also outputs the YMCK data to the output color predicting section 103 concurrently to the output to the printer 104 described above. The output color predicting section 103 predicts the output colors, and the output values L"a"b" are fed back to the error computing/error adding section 101. Then the error computing/error adding section 101 computes the error from the input color Lab as well as from the predicted color L"a"b", and adds the error to a value of each of the subsequent pixels. Namely, this operation is a feature of Embodiment 1.

The output color selecting section 102 computes a distance between the output color data L'a'b' sent from the error computing/error adding section 101 and the color reproduced by the printer 104, and selects the closest color, or executes color correction by means of eight-point interpolation or masking. Description is made for this color correction processing with reference to FIG. 2 and FIG. 3.

Figure 2:
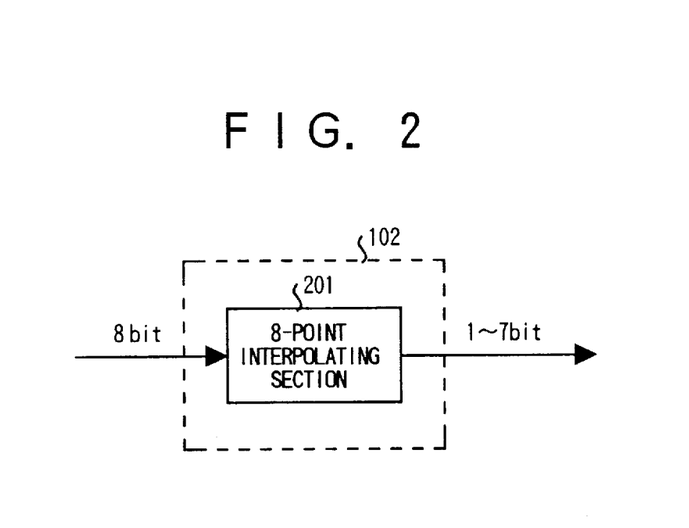
FIG. 2 is a block diagram showing a color correcting device by means of 8-point interpolation used in an output color selecting section according to Embodiment 1.

FIG. 2 is a block diagram sowing a color correcting device based on eight-point interpolation used in the output color selecting section 102, and the reference numeral 201 indicates an eight-point interpolating section generally used, in which an input color space is divided into a plurality of unit cubes, a prespecified color correction value is set for each of eight lattice points of each unit cube, and a color correction value for an input color resolution signal positioned at a middle of the lattice points is computed by means of linear interpolation of color connection value of eight pieces. In this embodiment, eight-bit input color data is rounded to 1 to 7-bit color data by the eight-point interpolating section 201 and the rounded color data is outputted.

Figure 3:
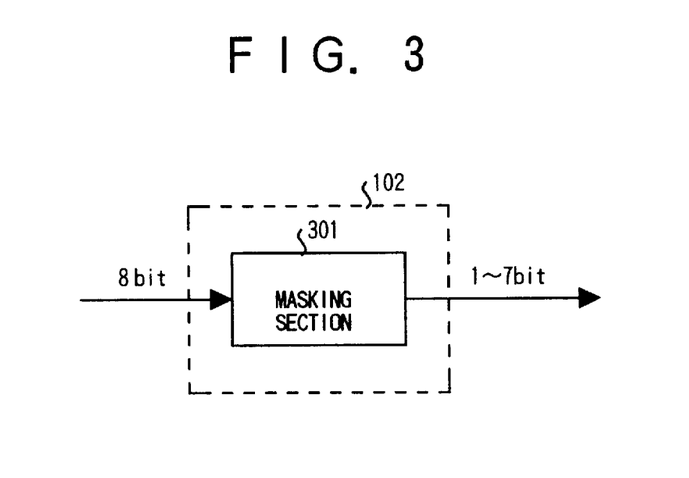
FIG. 3 is a block diagram showing the color correcting device by means of masking interpolation used in the output color selecting section according to Embodiment 1.

FIG. 3 is a block diagram showing a color correcting device based on eight-point interpolation used in the output color selecting section 102, and in this figure, the reference numeral 301 indicates a masking section which executes linear or non-linear color correction, and in this embodiment, like in the embodiment described above, eight-bit input color data is rounded by the masking section 301 to 1 to 7-bit data, and the rounded data is outputted.

For the reasons above, by executing the processing to be executed by the output color selecting section 102 with the configuration shown in FIG. 2 or FIG. 3, a bit number of image data can be rounded to a bit number allowing reproduction by the printer 104. Also in this case, it is possible to shorten a time required for processing or reduce a quantity of required hardware by executing the ordinary color correction processing.

By the way, in this embodiment, input color data may be device-dependent data or device-independent data, but device-independent data is preferable because in that case an error of a color itself is used for the processing and the error can be made smaller than that of the color itself.

Figure 4:
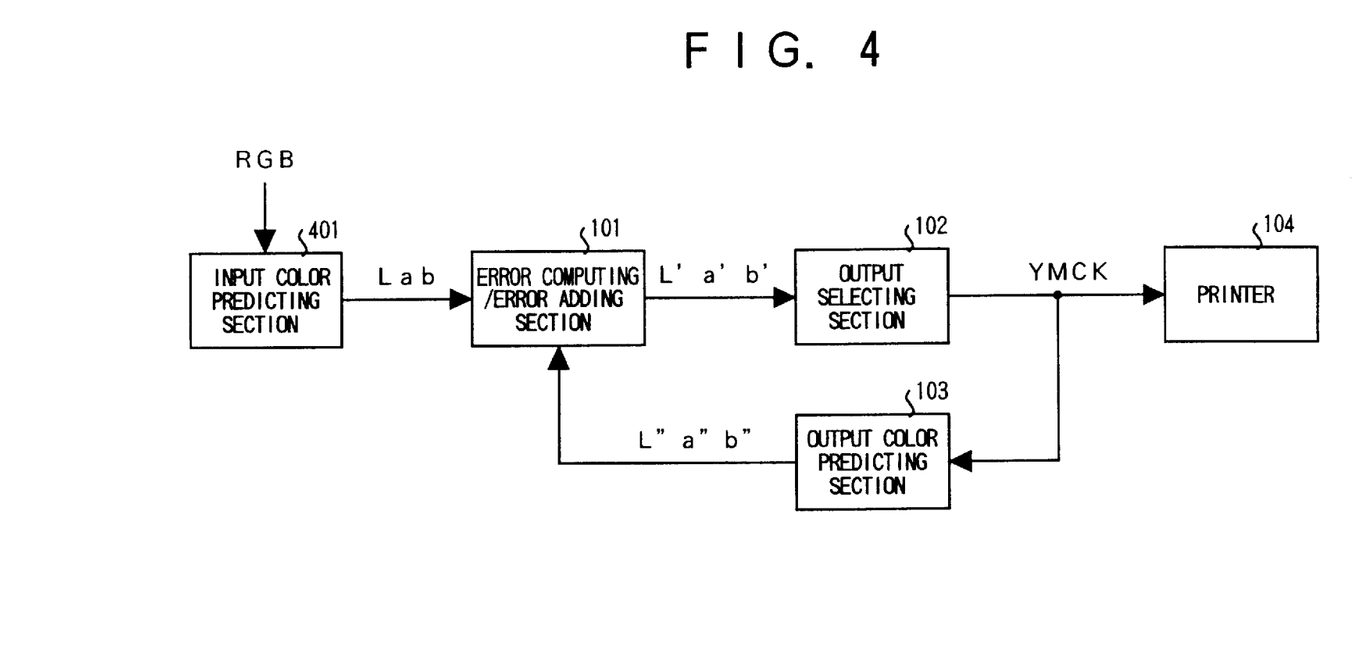
FIG. 4 is a block diagram showing a general configuration of the image processing apparatus optimal in a case where an input color is device-dependent data according to Embodiment 2.

Next, a description is made for Embodiment 2. FIG. 4 is a block diagram showing a general configuration of an image processing apparatus suited for use in a case where input color data is device-dependent data.

In Embodiment 2, an input color predicting section 401 is added as an input color predicting means to the configuration shown in FIG. 1 above. This configuration is a feature of Embodiment 2. It should be noted that other components and the functions are the same as those shown in FIG. 1 and for this reason the same reference numerals as those used in FIG. 1 are assigned to the same components as those shown in FIG. 1 and description thereof is omitted herein.

The image processing device having the configuration as described above at first receives RGB data with the input color predicting section 401, where the RGB data is converted to device-independent data. Then the converted data is outputted to the error computing/error adding section 101, and then executes the same processing as that in Embodiment 1, thus the error being made smaller.

Figure 5:
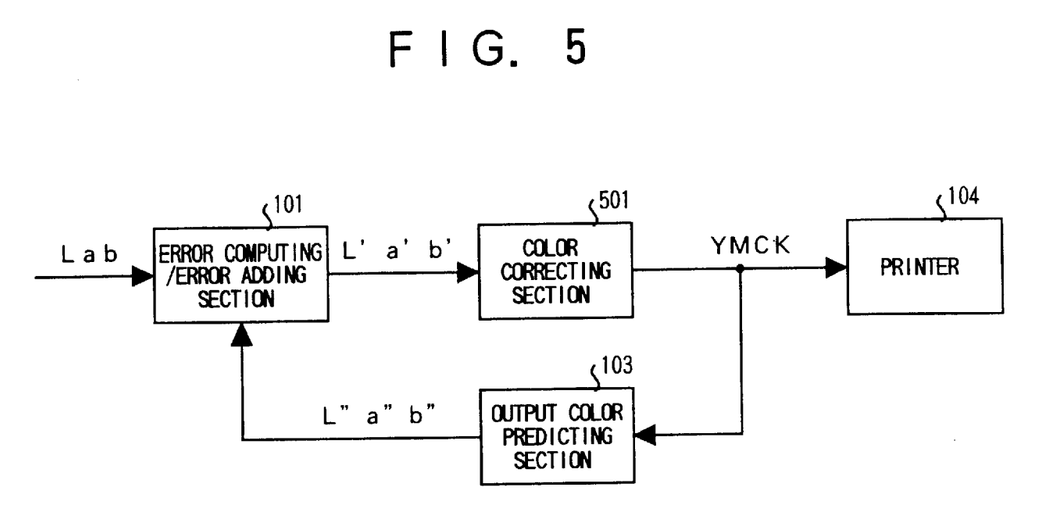
FIG. 5 is a block diagram showing a general configuration of an image processing apparatus according to Embodiment 3.
Figure 6:
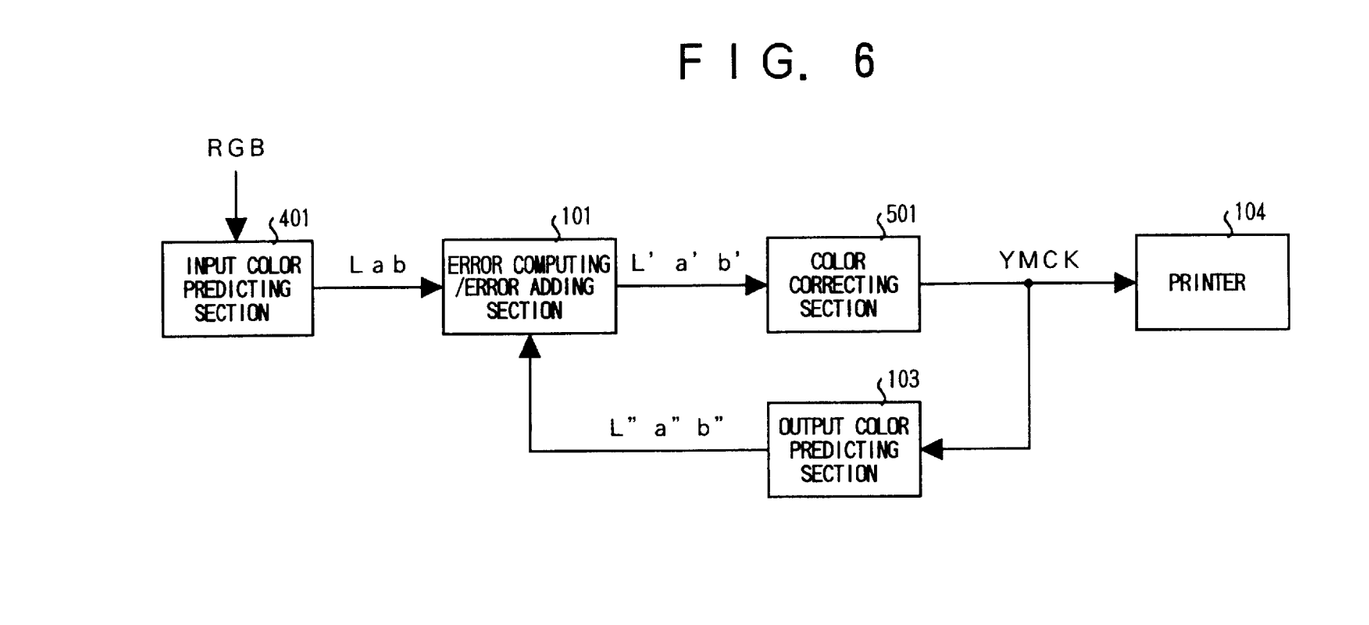
FIG. 6 is a block diagram showing a general configuration of another type of image processing apparatus according to Embodiment 3.

Next, a description is made for Embodiment 3 of the present invention. The image processing apparatus according to Embodiment 3 is shown in FIG. 5 and FIG. 6. Herein, FIG. 5 corresponds to FIG. 1 above, while FIG. 6 corresponds to FIG. 4 above, and in the image processing apparatus shown in FIG. 5 and FIG. 6, the output selecting section 102 in the image processing apparatus shown in FIG. 1 and FIG. 4 has been replaced with a color correcting section 501. It should be noted that other components and the functions are the same as those shown in FIG. 1 and FIG. 4 and for this reason, the same reference numerals are assigned to the same sections as those shown in FIG. 1 and FIG. 4 and description thereof is omitted herein.

Figure 7:
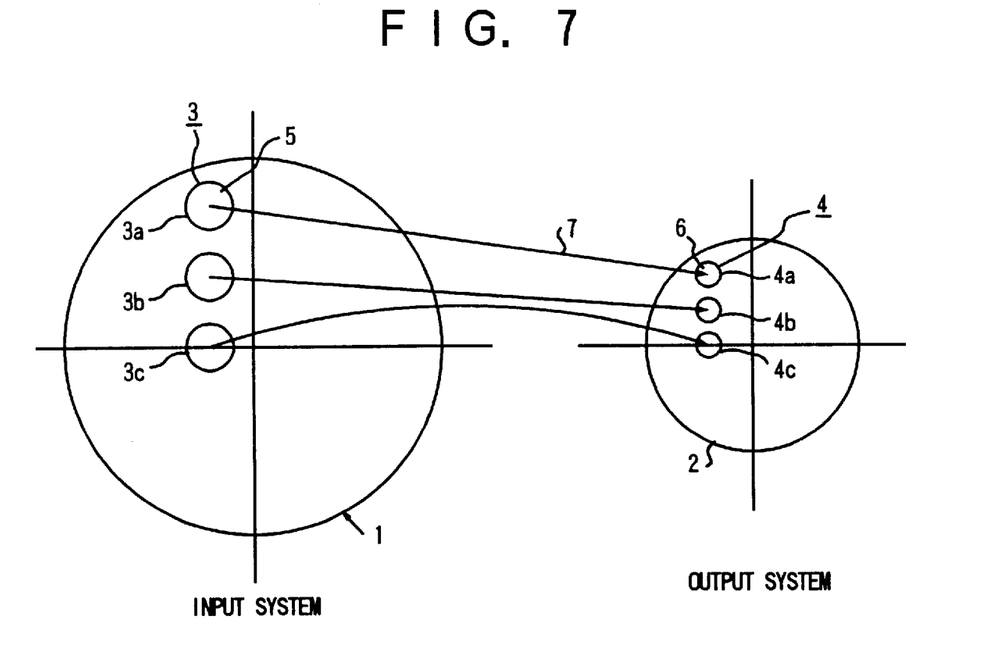
FIG. 7 is an explanatory view showing a concept of a method of specifying colors according to Embodiment 3.
Figure 8:
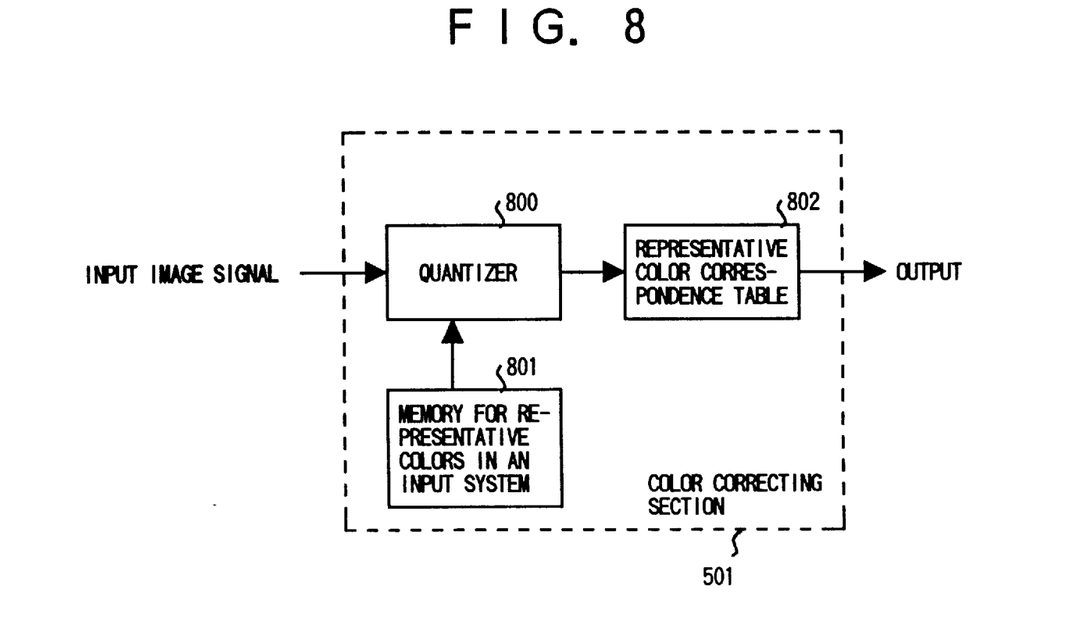
FIG. 8 is a block diagram showing a general configuration of a color correcting section according to Embodiment 3.

FIG. 7 is a simulated view for explanation of a method of specifying a color by the color correcting section 501 above, and FIG. 8 is a block diagram showing a general configuration of the color correcting section 501 for executing the method of specifying a color.

In FIG. 7, reproduction range 1, 2 in each of an input system and an output system are divided to a plurality of clusters 3 (3a, 3b, 3c) and 4 (4a, 4b, 4c) respectively, and colors positioned at a center of the clusters 3, 4 respectively are regarded as representative colors 5, 6. Then correspondence between the representative colors 5, 6 is decided (correspondence line 7). As a method for clustering, various types of techniques for computing code vectors in vector quantization can be employed.

Then in FIG. 8, an input image signal is inputted into a quantizer 800, and is quantized to any of representative colors in a representative color memory for an input system 801. In quantization, generally a distance is computed, and input color data is quantized to the closest representative color. Code data quantized to a representative color for an input system is inputted to a representative color correspondence table 802, where correspondence of the code data to a representative color for an output system is decided, and one of the representative colors for the output system is outputted to the output system.

For the reasons as described above, in this system, even if a reproduction range in an input system is substantially different from that in an output system, 1 vs 1 correspondence between representative colors each of the reproduction ranges for the input system and for the output system can be fixed, so that a natural output with excellent gradation can be obtained. The processing described above can also be realized by previously executing computing for the processing above and using a table memory with the data obtained through the processing above stored therein.

Also in this case, a time required for the processing can be shortened and even signals for high speed machines such as a video or a laser printer can be processed in the real time mode.

Furthermore, by selecting a representative color uniformly diffused in the reproduction range from colors which can be reproduced with combinations of gradations which can be expressed for each color by an output device, color reproduction is executed with a smaller number of colors than a number of gradations which the output device can express, so that effect by color fluctuation in the output device is small and stable color reproduction is realized.

Figure 9A:
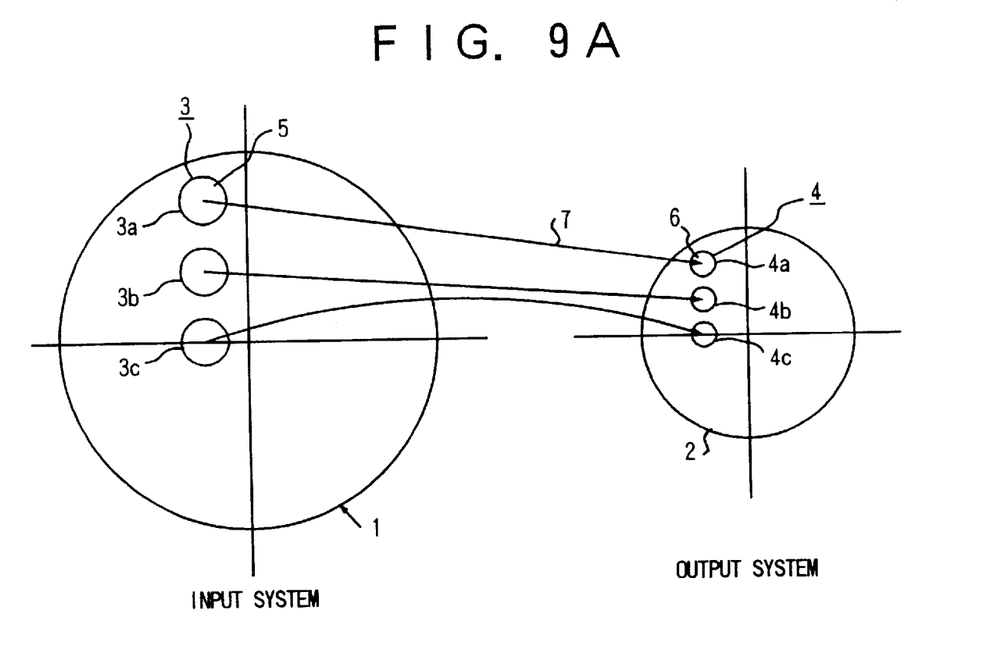
FIGS. 9A and 9B are explanatory views showing a concept of a method of specifying colors according to Embodiment 4.
Figure 9B:
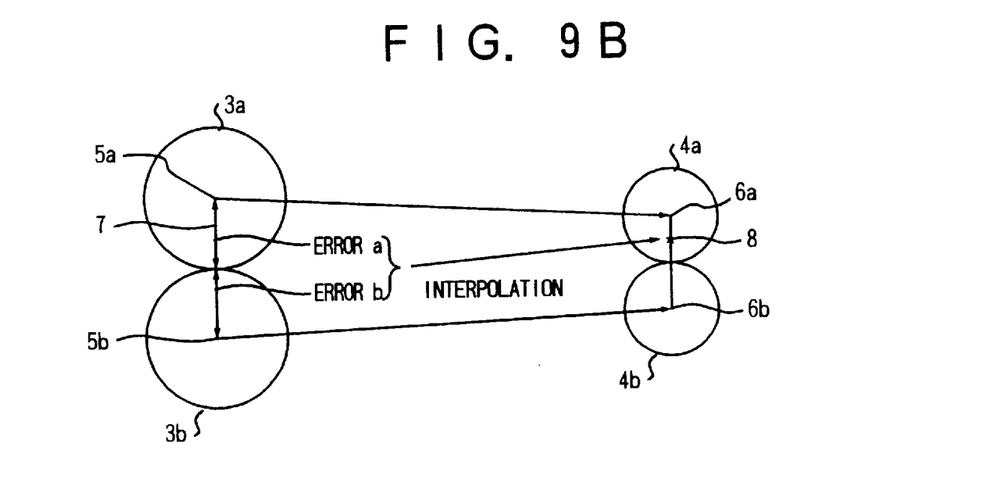
Figure 10:
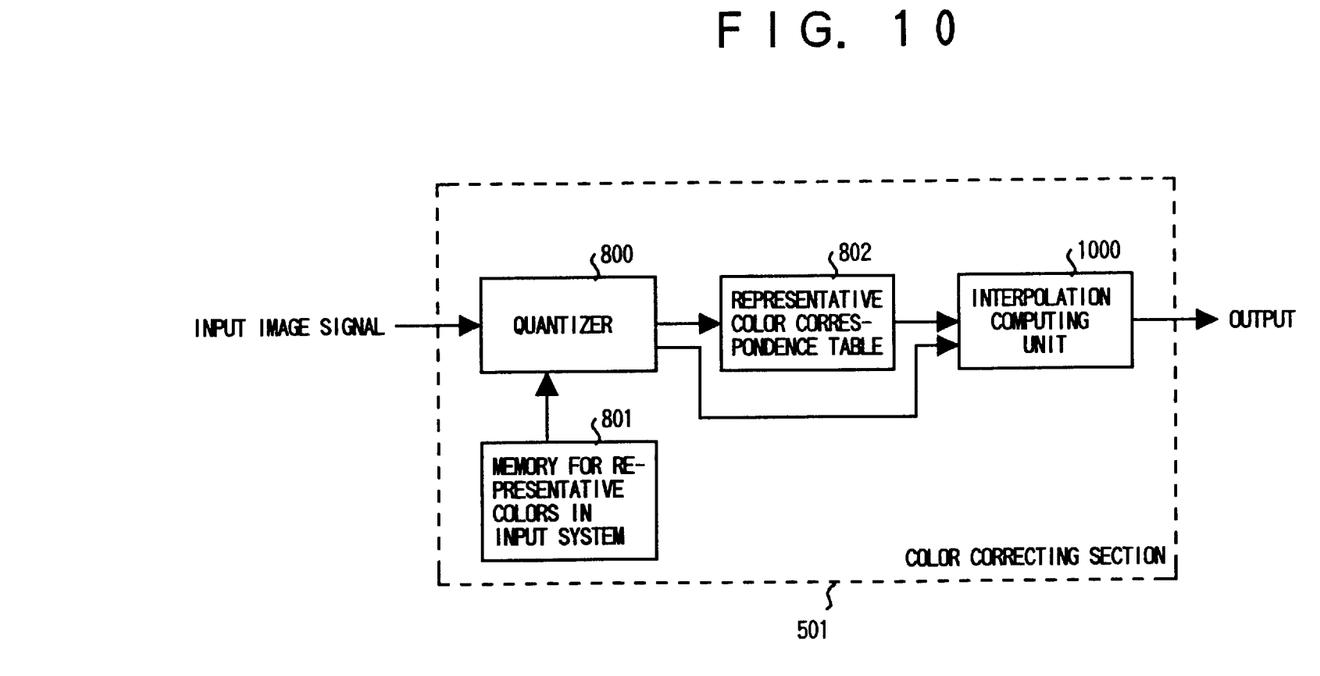
FIG. 10 is a block diagram showing a general configuration of a color correcting section according to Embodiment 4.

Next, a description is made for Embodiment 4. FIGS. 9A and 9B are simulated views for explanation of a method of specifying colors according to Embodiment 4, and FIG. 10 is a block diagram showing a general configuration of the color correcting section 501 executing the color specifying method.

In FIG. 9A, reproduction ranges 1, 2 for each of an input system and an output system are divided into a plurality of clusters 3 (3a, 3b, 3c) and 4 (4a, 4b, 4c), and colors at centers of the clusters 3, 4 are regarded as representative colors 5, 6.

Then correspondence between the representative colors 5, 6 are decided (correspondence line 7). As a method of clustering, various techniques for computing code vectors in vector quantization can be used.

Furthermore, as shown in FIG. 9B, to the input color 7 in the input system, in addition to the cluster 3a to which the input color 7 belongs, at least an adjacent cluster 3b is decided, the errors a, b from the representative colors 5a, 5b are obtained, computing for interpolation with representative colors 6a, 6b in the output system corresponding to the representative colors 5a, 5b in each input system is executed, then output colors for the output system 8 being decided.

Then in FIG. 10, an input image signal is inputted into the quantizer 800 in the color correcting section 501 and quantized to any of the representative colors in the memory 801 for representative colors in the input system. For quantization, generally computing is executed for obtaining a distance, and the closest representative color and another representative color close to the closest color are selected. The code data quantized to a representative color for the input system is inputted into the representative color correspondence table 802, where correspondence of the code data to a representative color for the output system is decided and then the data is inputted into an interpolation computing unit 1000.

Also an error generated during quantization is inputted from the quantizer 800 to the interpolation computing unit 1000, where output colors are decided by means of computing for interpolation and the colors are outputted.

In this system, even if a reproduction range in an input system is substantially different from a range in an output system, 1 vs. 1 correspondence between representative colors in the reproduction ranges is established, and an intermediate color between the correspondent colors is obtained by means of interpolation, so that a natural output with excellent gradation can be obtained.

Also the above-described processing can be realized by previously executing computing for the processing above and using a table memory with data obtained through the processing above stored therein. In this case, the processing time can be shortened, and also signals for high speed machines such as a video or a laser printer can be processed in real time.

Furthermore in a printer for electronic photographic system, gradation reproducibility/color reproducibility changes due to changes of environmental parameters or changes associated with elapse of time, and the fluctuation is especially large in a hi-lighted section. If an image is reproduced by using only a portion of reproducable colors like in this embodiment, a hi-lighted section is not used, so that the output colors are stabilized.

Next, a description is made for color prediction processing by the output color predicting section 103 or the input color predicting section 401 shown in FIG. 1 and FIG. 4 to FIG. 6 respectively. The output color predicting section 103 or the input color predicting section 401 each for executing color prediction processing builds up a formula for color prediction according to input color data. Herein the formula for color prediction is based on a model of the output characteristics of the printer 104 and makes it possible to obtain a measured value from a device signal by means of computing, and this processing is indispensable for efficiently obtaining parameters for color conversion.

Then an output value corresponding to a PCS value at a lattice value is obtained through the formula for color prediction described above with parameters for color conversion decided. However, in a case of the YMCK printer as described herein, a YMCK output value for a PCS value can not be decided uniquely, so that an output value for K must be decided before by many means.

As described above, a formula for color prediction gives substantial influences over precision of color matching, so that it is a very important element technology. As a color reproduction model for a printer, such models as the color density model or Neugebauer color screentone model have been known.

As a main formula for color predictions, for instance, a system based on a neural net or a system based on a look-up table is available.

As described above, with the image processing apparatus according to the present invention, the output color predicting means predicts colors reproduced by a printer from YMCK signals outputted from the output color selecting means to the output device (printer), and a result of the prediction is fed back to the error computing means. Then the error computing means computes an error between a fed-back color predicted by the printer and a color in input image data, diffuses the error to peripheral pixels and adds the diffused error to a value of each of the pixels, gives the resultant value to the output selecting means, and a color reproduced by the printer closest to a color specified by input image data is selected thereby, so that it is possible to avoid generation of texture images, and to obtain a satisfactory reproduced image.

With the image processing apparatus according to the present invention, the input color predicting means receives device-dependent image data, predicts device-independent colors of the input image, and inputs the predicted color into the error computing means. Then the output color predicting means predicts a color reproduced by the printer from YMCK signals outputted from the output color selecting means to the output device (printer), and feeds back the result thereof to the error computing means. Therein, the error computing means computes an error between a fed-back color predicted by the printer and a color in input image data, diffuses the error to peripheral pixels and adds the diffused error to a value of each of the pixels, gives the resultant value to the output color selecting means, and a color reproduced by the printer closest to a color specified by the input image data is selected thereby, so that it is possible to avoid generation of texture images, and to obtain color reproduction more accurate to the device-dependent data.

With the image processing apparatus according to the present invention, input image data is allocated to one of representative colors representing a color reproduction range in an input system, and one of representative colors representing a color reproduction range in an output system is made correspond to one of representative colors in the input system, so that color reproduction can be realized under stable conditions which color variation in an output device hardly affects.

With the image processing apparatus according to the present invention, color reproduction more accurate to device-dependent data can be executed by setting input image data processed by the error computing means to device-independent color data.

With the image processing apparatus according to the present invention, reduction of a period of time required for the processing as well as reduction of weight in a volume of hardware can be achieved by setting a bit number for color correction output to a value smaller than a bit number for an input and outputting it by using a color correction system for ordinary output color selecting means, for instance, by using a color correction system with 8-point interpolation or masking.

With the image processing apparatus according to the present invention, a color image can be reproduced by using colors less than color s to be used for expression, so that a hi-lighted section is not used, which makes it possible to stabilize output colors.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image processing apparatus for outputting a multi-gradation color image by using an output device which can express only colors smaller than colors in input image data comprising:

an output color predicting means for predicting colors reproduced by said output device from color control signals given to said output device;

an error computing means for receiving an input image data and the predicted colors predicted by said output color predicting means and for computing an error between a color in the input image data and a color predicted by said output color predicting means, diffusing said error to peripheral pixels and adding the diffused error to a value of each of the pixels; and an output color selecting means for outputting the color control signals to said output device and for selecting a color to be reproduced by said output device closest to a color specified by input image data according to an output from said error computing means, wherein said output color selecting means uses a color correction processing in which a bit number for color correction output is set to a value smaller than a bit number for an input.

2. An image processing apparatus according to claim 1; wherein input image data input into said error computing means is device-independent (not machine-dependent) color data.

3. An image processing apparatus for outputting a multi-gradation color image by using an output device which can express only colors smaller than colors in inputted image data comprising:

an input color predicting means for receiving device-dependent input image data and predicting device-independent colors of the input image;

an output color predicting means for predicting colors reproduced by said output device from color control signals given to said output device;

an error computing means for receiving the predicted device-independent colors from said input color predicting means and the predicted colors from said output color predicting means and for computing an error between at least one of the predicted colors from said input color predicting means and a corresponding predicted color from said output color predicting means, diffusing said errors to peripheral pixels, and adding the diffused error to a value of each of the pixels; and an output color selecting means for outputting the color control signals to said output device and for selecting colors to be reproduced by said output device closest to input image data according to an output from said error computing means, wherein said output color selecting means uses a color correction processing in which a bit number for color correction output is set to a value smaller than a bit number for an input.

4. An image processing apparatus according to claim 3, wherein input image data inputted into said error computing means is device-independent (not machine-dependent) color data.

5. An image processing apparatus for outputting a multi-gradation color image by using an output device which can express only colors smaller than colors in input image data comprising:

an output color predicting means for predicting colors reproduced by said output device from color control signals given to said output device;

an error computing means for receiving an input image data and the predicted colors predicted by said output color predicting means and for computing an error between a color specified by the input image data and a color predicted by said output color predicting means, diffusing the error to peripheral pixels, and adding the diffused error to a value of each of the pixels; and a color correcting means for allocating input image data to one of representative colors representing a color reproduction range in an input system and also corresponding one of representative colors representing a color reproduction range in an output system to one of representative colors in the input system, wherein said color correction means executes computing for interpolation with an error signal when an input color image signal is allocated to a representative color and to at least 2 representative colors in an output system for deciding a color to be outputted.

6. An image processing apparatus according to claim 5; wherein input image data inputted into said error computing means is device-independent (not machine-dependent) color data.

7. An image processing apparatus for outputting a multi-gradation color image by using an output device which can express only colors smaller than colors in input image data comprising:

an input color predicting means for receiving device-dependent input image data and predicting device-independent colors of the input image;

an output color predicting means for predicting colors reproduced by said output device from color control signals given to said output device;

an error computing means for receiving the predicted device-independent colors from said input color predicting means and the predicted colors from said output color predicting means and for computing an error between at least one of the predicted colors from said input color predicting means and a corresponding predicted color from said output color predicting means, diffusing said error to peripheral pixels, and adding the diffused-error to a value of each of the pixels; and a color correcting means for allocating input image data to one of representative colors representing a color reproduction range in an input system and also corresponding one of representative colors representing a color reproduction range in an output system to one of representative colors in the input system, wherein said color correction means executes computing for interpolation with an error signal when an input color image signal is allocated to a representative color and to at least 2 representative colors in an output system for deciding a color to be outputted.

8. An image processing apparatus according to claim 7; wherein input image data inputted into said error computing means is device-independent (not machine-dependent) color data.

9. An image processing apparatus for outputting a multi-gradation color image by using an output device which can express only colors smaller than colors in input image data comprising:

an output color predicting means for predicting colors reproduced by said output device from color control signals given to said output device;

an error computing means for computing an error between a color in input image data and a color predicted by said output color predicting means, diffusing said error to peripheral pixels and adding the diffused error to a value of each of the pixels; and an output color selecting means for selecting a color to be reproduced by said output device closest to a color specified by input image data according to an output from said error computing means; and wherein said output color selecting means uses a color correction processing in which a bit number for color correction output is set to a value smaller than a bit number for an input.

10. An image processing apparatus according to claim 9; wherein input image data input into said error computing means is device-independent (not machine-dependent) color data.

11. An image processing apparatus for outputting a multi-gradation color image by using an output device which can express only colors smaller than colors in inputted image data comprising:

an input color predicting means for receiving device-dependent input image data and predicting device-independent colors of the input image;

an output color predicting means for predicting colors reproduced by said output device from color control signals given to said output device;

an error computing means for computing an error between a predicted color from said input color predicting means and a predicted color from said output color predicting means, diffusing said errors to peripheral pixels, and adding the diffused error to a value of each of the pixels; and an output color selecting means for selecting colors to be reproduced by said output device closest to input image data according to an output from said error computing means; and wherein said output color selecting means uses a color correction processing in which a bit number for color correction output is set to a value smaller than a bit number for an input.

12. An image processing apparatus according to claim 11; wherein input image data inputted into said error computing means is device-independent (not machine-dependent) color data.

13. An image processing apparatus for outputting a multi-gradation color image by using an output device which can express only colors smaller than colors in input image data comprising:

an output color predicting means for predicting colors reproduced by said output device from color control signals given to said output device;

an error computing means for computing an error between a color specified by input image data and a color predicted by said output color predicting means, diffusing the error to peripheral pixels, and adding the diffused error to a value of each of the pixels; and a color correcting means for allocating input image data to one of representative colors representing a color reproduction range in an input system and also corresponding one of representative colors representing a color reproduction range in an output system to one of representative colors in the input system; and wherein said color correcting means executes computing for interpolation with an error signal when an input color image signal is allocated to a representative color and at least 2 representative colors in an output system for deciding a color to be outputted.

14. An image processing apparatus according to claim 13; wherein input image data inputted into said error computing means is device-independent (not machine-dependent) color data.

15. An image processing apparatus for outputting a multi-gradation color image by using an output device which can express only colors smaller than colors in input image data comprising:

an input color predicting means for receiving device-dependent input image data and predicting device-independent colors of the input image;

an output color predicting means for predicting colors reproduced by said output device from color control signals given to said output device;

an error computing means for computing an error between a predicted color from said input color predicting means and a predicted color from said output color predicting means, diffusing said error to peripheral pixels, and adding the diffused-error to a value of each of the pixels; and a color correcting means for allocating input image data to one of representative colors representing a color reproduction range in an input system and also corresponding one of representative colors representing a color reproduction range in an output system to one of representative colors in the input system; and wherein said color correcting means executes computing for interpolation with an error signal when an input color image signal is allocated to a representative color and at least 2 representative colors in an output system for deciding a color to be outputted.

16. An image processing apparatus according to claim 15; wherein input image data inputted into said error computing means is device-independent (not machine-dependent) color data.

* * * * *